(12) United States Patent  (10) Patent No.: US 9,118,362 B2
Chen et al.  (45) Date of Patent: Aug. 25, 2015

(54) SYSTEM FOR SELECTING TRANSMISSION MODE UNDER MULTI-INPUT MULTI-OUTPUT BASED ON SCHEDULING NUMBER AND METHOD THEREOF

(71) Applicants: Xiang Chen, Kaohsiung (TW); Jenq Neng Hwang, Kaohsiung (TW); Hsuan Jung Su, Kaohsiung (TW); Chung Nan Lee, Kaohsiung (TW)

(72) Inventors: Xiang Chen, Kaohsiung (TW); Jenq Neng Hwang, Kaohsiung (TW); Hsuan Jung Su, Kaohsiung (TW); Chung Nan Lee, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 63 days.

(21) Appl. No.: 13/940,489

(22) Filed: Jul. 12, 2013

(65) Prior Publication Data

US 2015/0016556 A1 Jan. 15, 2015

(51) Int. Cl.
*H04B 7/04* (2006.01)
*H04B 7/06* (2006.01)
*H04L 25/03* (2006.01)
*H04L 1/00* (2006.01)
*H04B 7/08* (2006.01)

(52) U.S. Cl.
CPC ............ *H04B 7/0413* (2013.01); *H04B 7/0689* (2013.01); *H04B 7/0697* (2013.01); *H04B 7/0871* (2013.01); *H04L 1/0003* (2013.01); *H04L 1/0009* (2013.01); *H04L 1/0026* (2013.01); *H04L 2025/03426* (2013.01)

(58) Field of Classification Search
CPC .. H04B 7/0689; H04B 7/0697; H04B 7/0871; H04L 1/0003; H04L 1/0009; H04L 1/0026; H04L 2025/03426
See application file for complete search history.

(56) References Cited

U.S. PATENT DOCUMENTS

| | | | | |
|---|---|---|---|---|
| 7,684,507 | B2 * | 3/2010 | Levy .............................. | 375/267 |
| 8,675,794 | B1 * | 3/2014 | Perets et al. ................... | 375/349 |
| 2004/0082356 | A1 * | 4/2004 | Walton et al. ................. | 455/522 |
| 2006/0121946 | A1 * | 6/2006 | Walton et al. ................. | 455/561 |
| 2010/0291918 | A1 * | 11/2010 | Suzuki et al. ............... | 455/422.1 |
| 2011/0150113 | A1 * | 6/2011 | Oyman et al. ................ | 375/260 |
| 2012/0307927 | A1 * | 12/2012 | Nammi et al. ................ | 375/267 |

\* cited by examiner

*Primary Examiner* — Shuwang Liu
*Assistant Examiner* — Ross Varndell
(74) *Attorney, Agent, or Firm* — Chih Feng Yeh; Huntington IP Consulting Co., Ltd.

(57) ABSTRACT

A system for selecting a transmission mode under the multi-input multi-output (MIMO) architecture based on a scheduling number and a method thereof are provided. A modulation coding of the spatial diversity (SD) mode and the spatial multiplexing (SM) mode according to channel state information sent from client ends is determined, respectively. The SD mode or the SM mode is selected in accordance with a scheduling number of using the SD mode and a scheduling number of using the SM mode, respectively. The transmission mode is selected based on the spectrum utilization and the scheduling rate, which achieves improving the spectrum utilization on the premise of the scheduling rate.

9 Claims, 4 Drawing Sheets

| combination | modulation | coding | SNR (dB) | spectral efficiency |
|---|---|---|---|---|
| 1 | QPSK | 1/2 | 5 | 1 |
| 2 | QPSK | 3/4 | 8 | 1.5 |
| 3 | 16 QAM | 1/2 | 10.5 | 2 |
| 4 | 16 QAM | 3/4 | 14 | 3 |
| 5 | 64 QAM | 1/2 | 16 | 3 |
| 6 | 64 QAM | 2/3 | 18 | 4 |
| 7 | 64 QAM | 3/4 | 20 | 4.5 |

SYSTEM FOR SELECTING TRANSMISSION MODE UNDER MULTI-INPUT MULTI-OUTPUT BASED ON SCHEDULING NUMBER AND METHOD THEREOF

BACKGROUND

1. Technical Field

The present invention is related to a system for selecting a transmission mode and a method thereof. Particularly, the present invention is related to a system for selecting a transmission mode under the multi-input multi-output (MIMO) architecture based on a scheduling number and a method thereof.

2. Related Art

In response to rapid growth and necessity of high speed wireless networks, particularly the multi-media applications, multicasting systems have been widely employed. As a current multicasting system is concerned, two architectures are included: single-input single-output (SISO) and multi-input multi-output (MIMO).

In the SISO multicasting system, to guarantee a scheduling number, a common way is to use a modulation coding associated with the client with worst channel condition as a basis to conduct a data transmission process, so as to be received the data by as many client ends as the system can.

However, the SISO architecture may cause a rapid reduction of spectral efficiency of the multicasting system, which is compared to the MIMO system case where the multicasting system may select a transmission mode between a spatial diversity (SD) and a spatial multiplexing (SM) based on a scheduling number and the spectral efficiency. The SM mode can promote the transmission efficiency of the system by transmitting different data streams on multiple antennas. On the other hand, the SD mode encodes the signals spatiotemporally and transmits data stream associated therewith, thereby promoting a signal to noise ratio (SNR) of the received signal, and promotes a reliability of the system.

Although there have been some algorithms proposed for a theoretical communication capacity of the MIMO multicasting system, such as the one, by J. Xu, IEEE Trans. on Broadcasting, vol. 56, the scheduling rate factor is not considered and thus not appropriate for the real operations. In addition, algorithms for automatically switching modes and modulation coding have also been proposed for the MIMO system, such as the one, by C. Kim and J. Lee, 2008, but the scheduling rate factor is still absent.

In view of the above, there is a need to improve the state under the MIMO multicasting system where the transmission mode cannot be selected according simultaneously to the spectral efficiency and the scheduling rate, which may be long-felt and needs to be satisfied.

SUMMARY

In response to the shortcomings inherent in the currently used multi-input multi-output (MIMO) multicasting system, the present invention discloses a system for selecting a transmission mode based on a scheduling number in a MIMO architecture and a method thereof, in which the spectral efficiency and the scheduling rate can be simultaneously considered.

The system for selecting a transmission mode under a MIMO architecture based on a scheduling number, used in a base station transmitting/receiving data with a plurality of client ends by the MIMO architecture, according to the present invention, comprises a transmission module receiving a channel state information from the plurality of client ends, respectively; a signal to noise ratio (SNR) module determining a minimum equivalent diversity SNR in a spatial diversity (SD) mode corresponding to the plurality of client ends, respectively, and determining a minimum equivalent multiplexing SNR in a spatial multiplexing (SM) mode corresponding to the plurality of client ends, respectively, according to the respective channel state information; a modulation selection module selecting a diversity modulation coding in the SD mode according to the minimum equivalent diversity SNR, and selecting a multiplexing modulation coding in the SM mode according to the minimum equivalent multiplexing SNR; and a mode selection module selecting a transmission mode between the SD mode and the SM mode according to a diversity scheduling number corresponding to the diversity modulation coding and a multiplexing scheduling number corresponding to the multiplexing modulation coding to transmit data on the base station in the selected transmission mode.

The method for selecting a transmission mode under a multi-input multi-output (MIMO) architecture based on a scheduling number, used in a base station transmitting/receiving data with a plurality of client ends by the MIMO architecture, according to the present invention, comprises the steps of (a) receiving a channel state information from the plurality of client ends, respectively; (b) determining a minimum equivalent diversity signal to noise ratio (SNR) in a spatial diversity (SD) mode corresponding to the plurality of client ends, respectively, and determining a minimum equivalent multiplexing SNR in a spatial multiplexing (SM) mode corresponding to the plurality of client ends, respectively, according to the respective channel state information; (c) selecting a diversity modulation coding in the SD mode according to the minimum equivalent diversity SNR, and selecting a multiplexing modulation coding in the SM mode according to the minimum equivalent multiplexing SNR; and (d) selecting the transmission mode between the SD mode and the SM mode according to a diversity scheduling number corresponding to the diversity modulation coding and a multiplexing scheduling number corresponding to the multiplexing modulation coding to transmit data on the base station in the selected transmission mode, thereby achieving an improved spectrum utilization on the premise of the guaranteed scheduling rate.

The system and method disclosed in the present invention has the differences compared with the prior art dwelling in that determining a diversity modulation coding in the SD mode and a multiplexing modulation coding in the SM mode according to the respective channel state information received from the client ends; and selecting the transmission mode between the SD mode and the SM mode according to a diversity scheduling number corresponding to the diversity modulation coding and a multiplexing scheduling number corresponding to the multiplexing modulation coding.

BRIEF DESCRIPTION OF THE DRAWINGS

The invention will become more fully understood from the detailed description given herein below illustration only, and thus is not limitative of the present invention, and wherein.

DETAILED DESCRIPTION

The present invention will be apparent from the following detailed description, which proceeds with reference to the accompanying drawings, wherein the same references relate to the same elements.

In the present invention, the method for selecting a transmission mode under a multi-input multi-output (MIMO) architecture based on a scheduling number is used in a base station, which has several antennas along with the MIMO architecture providing a service for a plurality of client ends belonging to a multicast system.

In the method, the channel state information from the plurality of client ends, is respectively received. Based on the received channel state information, the modulation coding in a spatial diversity (SD) mode and the modulation coding in a spatial multiplexing (SM) may be selected.

Further, the scheduling number corresponding to the modulation coding in the SD mode and the scheduling number corresponding to the modulation coding in the SM mode are selected, respectively, to determine a transmission mode between the SD and SM modes for data transmission. Herein, the scheduling number is the number of client ends capable of data received from the base station, which may be used to calculate a scheduling rate, which is defined as a ratio of the scheduling number to the number of all the client ends communicatively connected to the base station.

In the present invention, the channel state information includes a signal to noise ratio (SNR), termed herein as a diversity SNR for clarity consideration, in the SD mode used at a client end, and a SNR, a multiplexing SNR named herein for clarity consideration, used in the SM mode, but not limited thereto.

Figure 1:
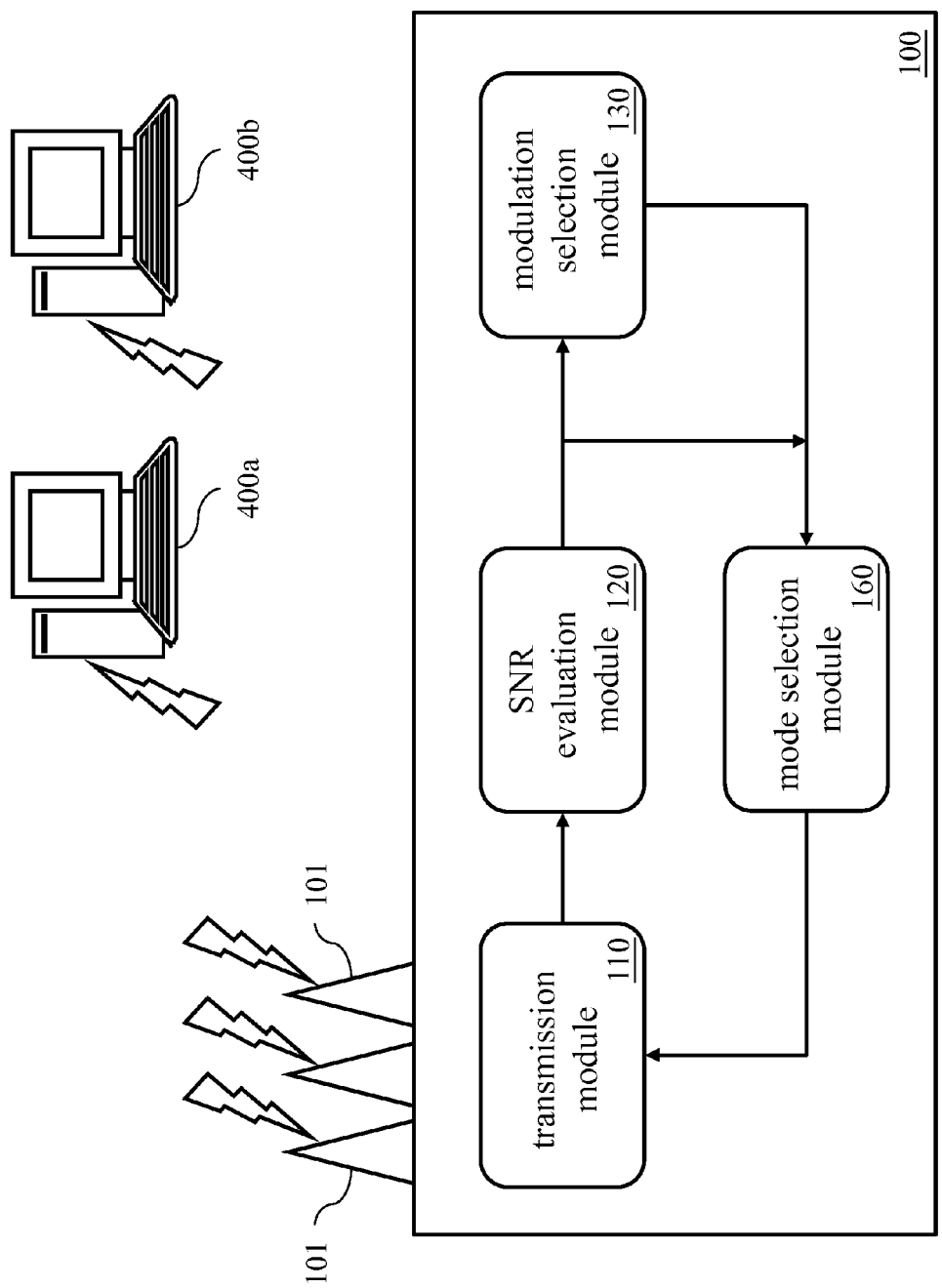
FIG. 1 is a schematic architecture diagram of a system for selecting a transmission mode in a multi-input multi-output (MIMO) architecture based on a scheduling number according to the present invention.

Referring to FIG. 1, the system for selecting a transmission mode under the MIMO architecture based on a scheduling number is illustrated in architecture therein for explanation of the system operation. As shown, the system comprises a transmission module 110, a SNR module 120, a modulation selection module 130, and a mode selection module 160.

The transmission module 101 receives a channel state information from the plurality of client ends 400a, 400b . . . communicatively connected to the base station 100 via a respective antenna 101, respectively. It is to be noted that the client ends may belong to one or more multicasting systems.

The SNR evaluation module 120 is used to determine a minimum equivalent diversity SNR in the SD mode corresponding to each of the multicasting systems, respectively, and determines a minimum equivalent multiplexing SNR in the SM mode corresponding to each of the multicasting systems, respectively, according to the respective channel state information received in the transmission mode 110.

In general, the SNR evaluation module 120 determines an equivalent diversity SNR in the SD mode corresponding to each client end in each of the multicasting systems, respectively, and determines an equivalent multiplexing SNR in the SM mode corresponding to each client end in each of the multicasting systems, respectively, according to the respective channel state information transmitted from each client end in each of the multicasting systems. Afterwards, the SNR evaluation module 120 further determines a minimum equivalent SNR in the SD mode and a minimum equivalent SNR based on the determined respective equivalent SNRs in the SD mode and the determined respective equivalent SNRs in the SM mode. However, the determination of the minimum equivalent SNRs in both the SD and SM modes at each of the client ends is not limited only thereto.

For clarity reason, "equivalent diversity SNR" is used herein to refer to the equivalent SNR in the SD mode, while "equivalent multiplexing SNR" is used to refer to the equivalent SNR in the SM mode. In parallel, "minimum equivalent diversity SNR" is used herein to refer to the equivalent SNR in the SD mode, while "minimum equivalent multiplexing SNR" is used to refer to the equivalent SNR in the SM mode.

The mentioned minimum equivalent diversity SNR/minimum equivalent multiplexing SNR in the present invention refers to that the channel state information transmitted from all the client ends have a SNR greater than the minimum equivalent diversity SNR and the minimum equivalent multiplexing SNR required by the respective multicasting system. For example, the base station 100 receives the channel state information from five client ends, and the recorded diversity/multiplexing SNRs in the five channel state information are 3 dB, 4 dB, 6 dB, 10 dB and 20 dB, respectively. Assuming the multicasting system including the five client ends requires a SNR of 5 dB, the minimum diversity SNR/minimum multiplexing SNR corresponding to the five client ends is a minimum greater than 5 dB, i.e. 6 dB.

The modulation selection module 130 selects a diversity modulation coding in the SD mode according to the minimum equivalent diversity SNR determined at the SNR evaluation mode 120, and selects a multiplexing modulation coding in the SM mode according to the minimum equivalent multiplexing SNR also determined at the SNR evaluation mode 120. To avoid ambiguity with respect to the modulation coding between the SD and SM modes, herein "diversity modulation coding" is used to refer to the modulation coding in the SD mode, while "multiplexing modulation coding" refers to the modulation coding in the SM mode.

In some embodiments, the modulation selection module 130 may establish in advance a corresponding table for providing the optimal diversity modulation coding/multiplexing modulation coding when the minimum equivalent diversity SNR/minimum equivalent multiplexing SNR is available. However, the present invention does not limit itself thereto.

The mode selection module 160 selects a transmission mode between the SD mode and the SM mode according to a diversity scheduling number corresponding to the diversity modulation coding and a multiplexing scheduling number corresponding to the multiplexing modulation coding, determined at the modulation selection module 130. As such, the data on the base station 100 is transmitted to the client ends in the selected transmission mode.

For clarity reason, the scheduling number and rate in the SD and SM modes is differentiated, respectively. "Diversity scheduling number" and "diversity scheduling rate" are used herein to refer to the scheduling number and scheduling rate in the SD mode, respectively, while "multiplexing scheduling number" and "multiplexing scheduling rate" are used to refer to the scheduling number and scheduling rate in the SM mode, respectively.

The mode selection module 160 also calculates a diversity spectral efficiency in the SD mode and a multiplexing spectral efficiency in the SM mode, and selects the transmission mode between the SD and SM modes according to the diversity scheduling number, the multiplexing scheduling number, the diversity spectrum rate and the multiplexing spectral efficiency.

For clarity reason, the spectral efficiencies in the SD and SM modes are differentiated in naming, respectively. "Diversity spectral efficiency" is used herein to refer to the spectral efficiency in the SD mode, while "multiplexing spectral efficiency" is used to refer to the spectral efficiency in the SM mode.

For example, the mode selection module 160 selects the SD mode when the diversity scheduling number is determined as being equivalent to the multiplexing scheduling number and the diversity spectral efficiency determined as being greater than the multiplexing spectral efficiency. The mode selection module selects the SD mode when the diversity scheduling number is determined as being greater than the multiplexing scheduling number. Alternatively, the mode selection module 160 selects the SM mode when the diversity scheduling number is determined as being smaller than or equivalent to the multiplexing scheduling number and the diversity spectral efficiency determined as being not greater than the multiplexing spectral efficiency. Namely, the mode selection module 160 selects the working mode in accordance with the principles: (1) selecting the mode corresponding to a higher scheduling number between the SD and SM mode, and (2) selecting the mode corresponding to a higher spectral efficiency, if the scheduling numbers are the same in the SD and SM modes.

In general, when the signals at the client ends are not good (lower SNRs), the mode selection module 160 has a higher possibility selecting the SD mode, so that the system reliability may be promoted. In contrast, when the signals at the client ends are good (SNRs each retained at a particular value), the mode selection module 160 may select the SM mode, so that the spectral efficiency may be promoted.

Figure 2A:
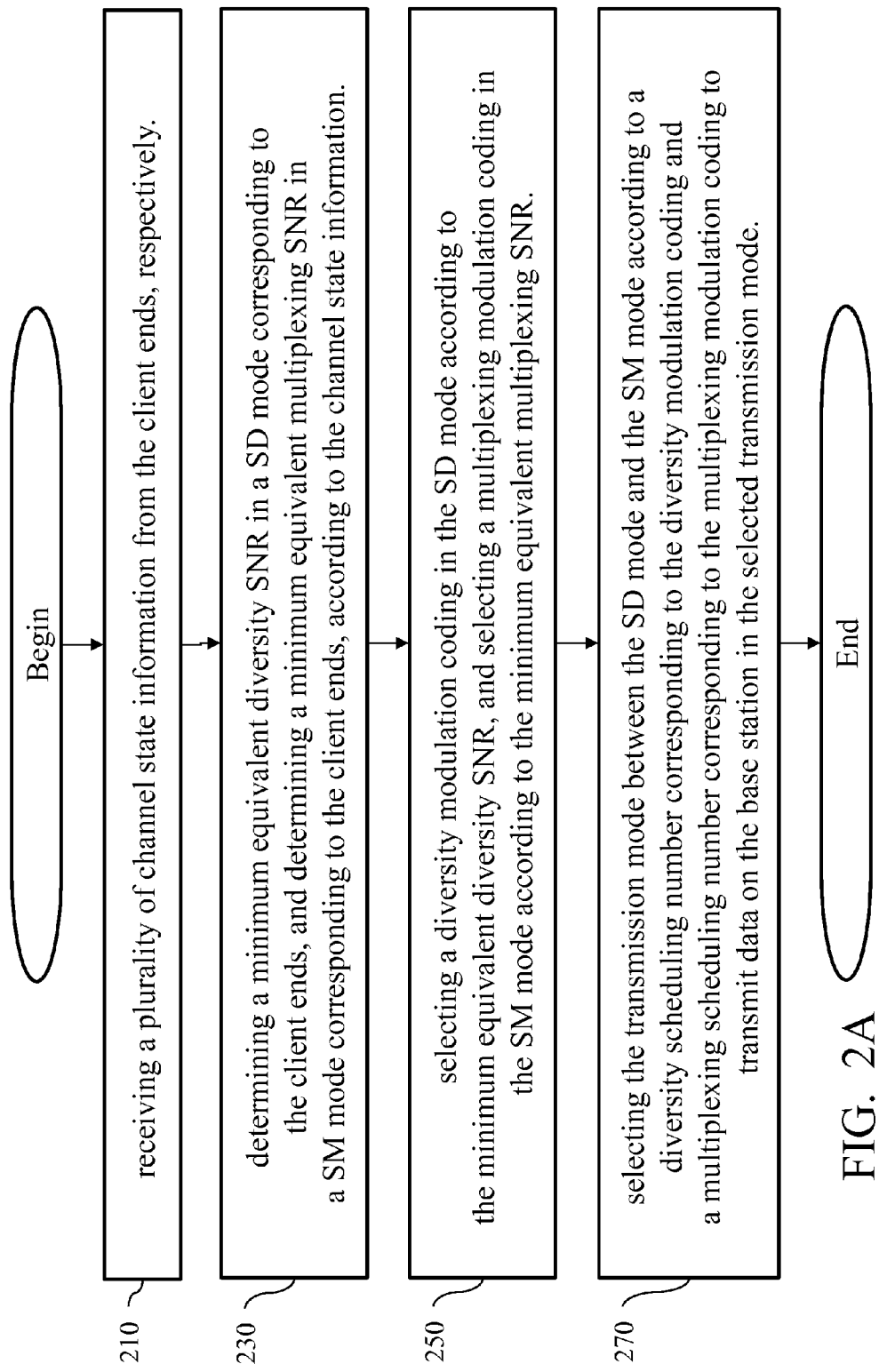
FIG. 2A is a flowchart of a method for selecting a transmission mode in a multi-input multi-output (MIMO) architecture based on the scheduling number according to the present invention.

Hereinafter, an embodiment is presented to describe the system and method of the present invention, with reference to FIG. 2A, which is a flowchart of a method for selecting a transmission mode in a multi-input multi-output (MIMO) architecture based on the scheduling number according to the present invention. This embodiment is assumed to be applied on a 2*2 multicasting system, but the present invention is not limited thereto.

At first, each of the client ends in the multicasting system will transmit periodically channel state information to the base station 100, and the transmission module 110 of the base station 110 receives the channel state information (Step 210).

Next, the SNR evaluation module 220 in the base station 100 determines a minimum equivalent diversity SNR in the SD mode and a minimum equivalent multiplexing SNR in the SM mode corresponding to all the client ends in the multicasting system, according to the respective channel state information received at the transmit module 110 (Step 230). In this embodiment, the SNR evaluation module 220.

In this embodiment, the SNR evaluation module 220 determines an equivalent SNR in the SD mode corresponding to each of the client ends, based on the SNRs recorded in respective channel state information in the SD mode. Further, the SNR evaluation module 220 determines a minimum equivalent diversity SNR, assumed as 12 dB, in the SD mode corresponding to the client ends, based on the determined equivalent SNRs for all the client ends in the same mode. In parallel, the SNR evaluation module 220 determines an equivalent SNR in the SM mode corresponding to the client ends, based on the SNRs recorded in respective channel state information in the SM mode. Further, the SNR evaluation module 220 determines a minimum equivalent SNR in the SM mode corresponding to data streams on two antennas, respectively, based on the determined equivalent SNRs for all the client ends in the same mode, assumed as 5 dB and 9 dB.

After the SNR evaluation module 220 determines the minimum equivalent diversity SNR in the SD mode and the minimum equivalent multiplexing SNR in the SM mode corresponding to all the client ends in the multicasting system, the modulation selection module 130 in the base station 100 selects a diversity modulation coding in the SD mode according to the minimum equivalent diversity SNR, and selecting a multiplexing modulation coding in the SM mode according to the minimum equivalent multiplexing SNR (Step 250).

Figure 3:
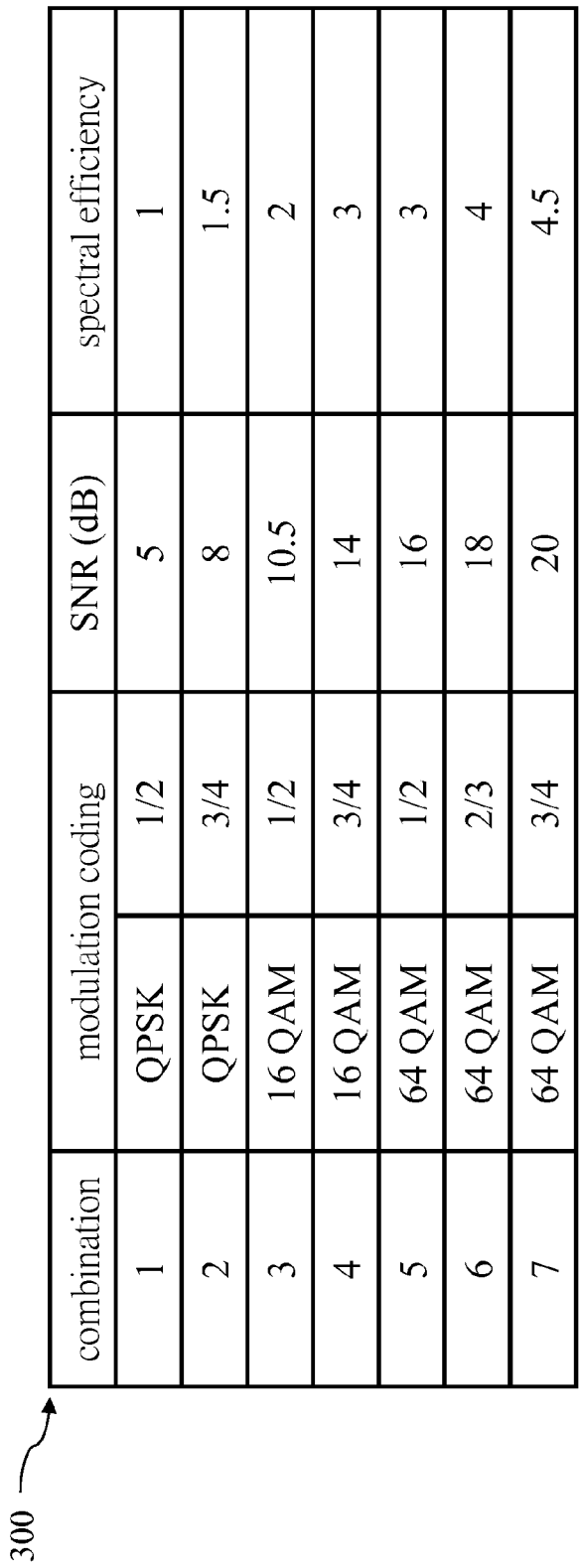
FIG. 3 is a corresponding table according to an embodiment of the present invention.

In this embodiment, the modulation selection module 130 is assumed to use the modulation coding shown in the corresponding table 300 in FIG. 3. Since the minimum diversity SNR is 12 dB, the modulation selection module 130 selects a use of the third modulation coding in the SD mode by referring to the corresponding table 300, i.e. the modulation coding 16 QAM ½. At this time, the corresponding table also points out the corresponding spectral efficiency is 2. In addition, since the minimum equivalent SNRs on the two antennas of the base station 100 are 5 dB and 9 dB, respectively, the modulation selection module 130 selects the modulation codings QPSK ½ and QPSK ¾ in the SM mode on the two antennas, respectively, by referring to the corresponding table 300. At this time, the spectral efficiencies of the two antennas are 1 and 1.5, respectively.

After the modulation selection mode 130 selects the SD and SM modulation codings, the mode selection module 160 in the base station 100 selects the transmission mode between the SD mode and the SM mode according to a diversity scheduling number corresponding to the diversity modulation coding and a multiplexing scheduling number corresponding to the multiplexing modulation coding (Step 270).

In this embodiment, the mode selection module 160 determines the number of the client ends capable of being received by the base station 100 (scheduling number) in the SD and SM modes, respectively, based on the SNRs recorded in the channel state information received in the transmission module 110. Namely, the mode selection module 160 determines the number of the channel state information having a SNR higher than 12 dB, i.e. the diversity scheduling number in the SD mode, and determines the number of the channel state information having a SNR higher than 5 dB on the antenna having the minimum equivalent SNR 5 dB and having a SNR higher than 9 dB on the antenna having the minimum equivalent SNR 9 dB, respectively, i.e. the multiplexing scheduling number in the SM mode.

Figure 2B:
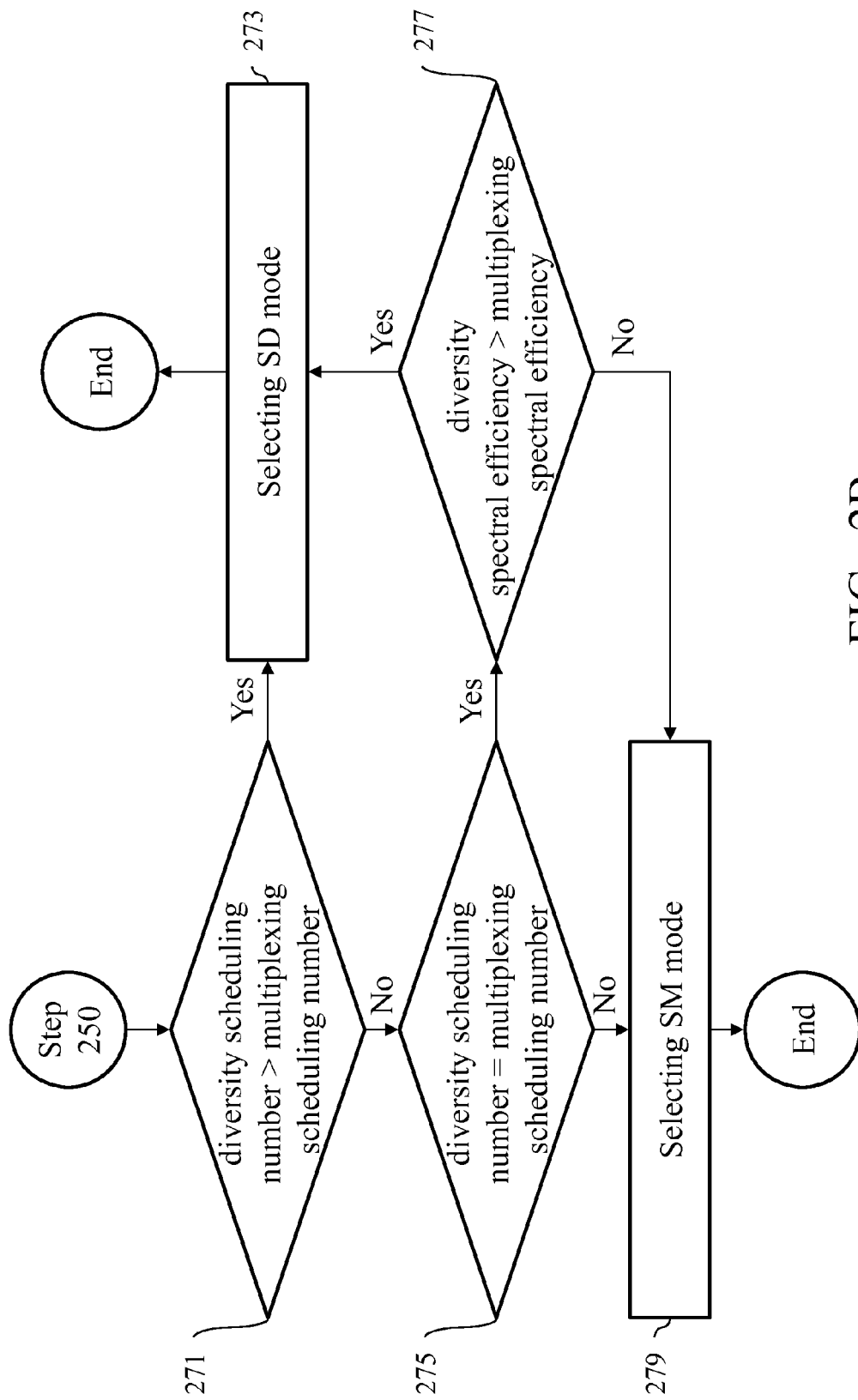
FIG. 2B is a more-detailed flowchart of the method for selecting a transmission mode in a multi-input multi-output (MIMO) architecture based on the scheduling number according to the present invention.

Afterwards, as shown in FIG. 2B, the mode selection module 160 determines if the diversity scheduling number is greater than the multiplexing scheduling number (Step 271). If the diversity scheduling number is 30 and the multiplexing scheduling number is 25, the diversity scheduling rate is greater than the multiplexing scheduling rate when the number of the client ends communicatively connected to the base station 100 is fixed, since the diversity scheduling number is greater than the multiplexing scheduling number (Step 273). If the diversity scheduling number is the same to the multiplexing scheduling number (Step 275), the mode selection module 160 further determines if the diversity spectrum rate is greater than the multiplexing spectral efficiency.

Since the base station 100 in the SD mode has a spectral efficiency is 2, the spectral efficiency in the SM mode (multiplexing spectral efficiency) in the base station 100 is a sum of the spectral efficiencies on the two antennas, i.e. 2.5 (1+1.5). At this time, since the diversity spectral efficiency is not greater than the multiplexing spectrum utilization, the mode selection module 160 selects the SM mode (Step 279).

Instead, the diversity spectral efficiency is greater than the multiplexing spectral efficiency, the mode selection module 160 selects the SD mode (Step 273). Or if the diversity scheduling number is smaller than the multiplexing scheduling number, the mode selection module 160 selects the SM mode (Step 279).

As such, the base station 100 may select the transmission mode by which the most client ends can receive data transmitted from the base station 100, after each time receiving the channel state information from the client ends.

In view of the above, the present invention has the differences compared with the prior art techniques in that determining a diversity modulation coding in the SD mode and a multiplexing modulation coding in the SM mode according to the respective channel state information received from the client ends, and selecting the transmission mode between the SD mode and the SM mode according to a diversity scheduling number corresponding to the diversity modulation coding and a multiplexing scheduling number corresponding to the multiplexing modulation coding. By using the present invention, that the transmission mode cannot be selected according simultaneously to the spectral efficiency and the scheduling rate in the prior art has been well overcome, thereby achieving an improved spectrum utilization on the premise of the guaranteed scheduling rate.

Furthermore, the inventive method for selecting a transmission mode under a MIMO architecture based on a scheduling number may be implemented in a hardware, a software, or a combination of hardware and software, or may be implemented in a computer system in a concentrated manner or in some discrete computer systems connected with one another in a discrete manner.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for selecting a transmission mode under a multi-input multi-output (MIMO) architecture based on a scheduling number, used in a base station transmitting/receiving data with a plurality of client ends through a plurality of antennas by the MIMO architecture, comprising the steps of:
receiving a plurality of channel state information from the client ends, respectively;
determining a minimum equivalent diversity signal to noise ratio (SNR) in a spatial diversity (SD) mode corresponding to the client ends, and determining a minimum equivalent multiplexing SNR in a spatial multiplexing (SM) mode corresponding to the client ends, according to the channel state information;
selecting a diversity modulation coding in the SD mode according to the minimum equivalent diversity SNR, and selecting a multiplexing modulation coding in the SM mode according to the minimum equivalent multiplexing SNR;
calculating a diversity spectral efficiency in the SD mode and a multiplexing spectral efficiency in the SM mode; and
selecting the transmission mode between the SD mode and the SM mode according to a diversity scheduling number corresponding to the diversity modulation coding a multiplexing scheduling number corresponding to the multiplexing modulation coding, the diversity spectral efficiency and the multiplexing spectral efficiency to transmit data from the base station in the selected transmission mode.

2. The method according to claim 1, wherein the step of selecting the transmission mode between the SD and SM modes according to the diversity scheduling number, the multiplexing scheduling number, the diversity spectral efficiency and the multiplexing spectral efficiency further comprises selecting the SD mode when the diversity scheduling number equals to the multiplexing scheduling number and the diversity spectral efficiency is greater than the multiplexing spectral efficiency.

3. The method according to claim 1, wherein the step of selecting the transmission mode between the SD mode and the SM mode according to the diversity scheduling number the multiplexing scheduling number, the diversity spectral efficiency and the multiplexing spectral efficiency further comprises selecting the SD mode when the diversity scheduling number is greater than the multiplexing scheduling number.

4. The method according to claim 1, wherein the step of determining a minimum equivalent diversity SNR in the SD mode corresponding to the client ends, and determining a minimum equivalent multiplexing SNR in the SM mode corresponding to the client ends, according to the channel state information further comprises a step of determining a plurality of equivalent diversity SNR in the SD mode corresponding to each of the client ends, respectively and determining a plurality of equivalent multiplexing SNR in the SM mode corresponding to each of the client ends, respectively, according to the respective channel state information, and determining the minimum equivalent diversity SNR according to the respective equivalent diversity SNR and determining the minimum equivalent multiplexing SNR according to the respective equivalent multiplexing SNR.

5. A system for selecting a transmission mode under a multi-input multi-output (MIMO) architecture based on a scheduling number, used in a base station transmitting/receiving data with a plurality of client ends through a plurality of antennas by the MIMO architecture, comprising:
a transmission module, which receives a plurality of channel state information from the client ends, respectively;
a signal to noise ratio (SNR) evaluation module electrically connected to the transmission module, which determines a minimum equivalent diversity SNR in a spatial diversity (SD) mode corresponding to the client ends and a minimum equivalent multiplexing SNR in a spatial multiplexing (SM) mode corresponding to the client ends, according to the channel state information;
a modulation selection module electrically connected to the SNR evaluation module, which selects a diversity modulation coding in the SD mode according to the minimum equivalent diversity SNR and a multiplexing modulation coding in the SM mode according to the minimum equivalent multiplexing SNR; and
a mode selection module electrically connected to the modulation selection module, which calculates a diversity spectral efficiency in the SD mode and a multiplexing spectral efficiency in the SM mode and selects a transmission mode between the SD mode and the SM mode according to a diversity scheduling number corresponding to the diversity modulation coding, a multiplexing scheduling number corresponding to the multiplexing modulation coding, the diversity spectral efficiency and the multiplexing spectral efficiency to transmit data from the base station in the selected transmission mode.

6. The system according to claim 5, wherein the SNR evaluation module determines a plurality of equivalent diversity SNR in the spatial diversity (SD) mode corresponding to each of the client ends, respectively, determines a plurality of equivalent multiplexing SNR in the spatial multiplexing (SM) mode corresponding to each of the client ends, respectively, according to the respective channel state information, and determines the minimum equivalent diversity SNR according to the respective equivalent diversity SNR and determines the minimum equivalent multiplexing SNR according to the respective equivalent multiplexing SNR.

7. The method according to claim 5, wherein the mode selection module selects the SD mode when the diversity scheduling number equals to the multiplexing scheduling number and the diversity spectral efficiency is greater than the multiplexing spectral efficiency.

8. The method according to claim 5, wherein the mode selection module selects the SD mode when the diversity scheduling number is greater than the multiplexing scheduling number.

9. The method according to claim 5, wherein each of the channel state information includes a diversity SNR in the SD mode and a multiplexing SNR in the SM mode.

* * * * *